(12) United States Patent
Grimshaw et al.

(10) Patent No.: US 11,135,787 B1
(45) Date of Patent: Oct. 5, 2021

(54) AUTOMATICALLY-THREADING FIBER PLACEMENT HEAD

(71) Applicant: Fives Machining Systems, Inc., Fond du Lac, WI (US)

(72) Inventors: Michael N. Grimshaw, Milford, OH (US); Christopher D. Nicholson, Cincinnati, OH (US)

(73) Assignee: FIVES MACHINING SYSTEMS, INC., Fond du Lac, WI (US)

( * ) Notice: Subject to any disclaimer, the term of this patent is extended or adjusted under 35 U.S.C. 154(b) by 0 days.

(21) Appl. No.: 17/011,277

(22) Filed: Sep. 17, 2020

(51) Int. Cl.
*B29C 70/38* (2006.01)
*B29C 70/54* (2006.01)

(52) U.S. Cl.
CPC .......... *B29C 70/384* (2013.01); *B29C 70/545* (2013.01); *B29C 70/382* (2013.01); *B29C 70/386* (2013.01); *Y10T 156/1317* (2015.01); *Y10T 156/1322* (2015.01)

(58) Field of Classification Search
CPC ..... B29C 70/38; B29C 70/382; B29C 70/384; B29C 70/386; B29C 70/388; B29C 70/545; Y10T 83/2196; Y10T 83/2209; Y10T 83/9411; Y10T 83/9447; Y10T 156/1322; Y10T 156/1317
See application file for complete search history.

(56) References Cited

U.S. PATENT DOCUMENTS

| 10,059,042 B2 | 8/2018 | Schneider et al. |
| 2006/0070697 A1* | 4/2006 | Hoffmann ............ B29C 70/382 156/166 |
| 2008/0202691 A1* | 8/2008 | Hamlyn ................ B65H 57/12 156/441 |
| 2009/0229760 A1 | 9/2009 | Hamlyn et al. |

FOREIGN PATENT DOCUMENTS

| CN | 104768725 A | 7/2015 |
| CN | 205086378 U | 3/2016 |
| EP | 738242 B1 | 4/1999 |
| EP | 2117818 B1 | 9/2010 |
| EP | 2709832 B1 | 10/2018 |
| WO | WO2010049424 A1 | 5/2010 |
| WO | WO2018087565 A1 | 5/2018 |

OTHER PUBLICATIONS

International Search Report for International Application No. PCT/US2020/049133 dated May 28, 2021 (4 pages).
Written Opinion for International Application No. PCT/US2020/049133 dated May 28, 2021 (4 pages).

* cited by examiner

*Primary Examiner* — Mark A Osele
*Assistant Examiner* — Christopher C Caillouet
(74) *Attorney, Agent, or Firm* — Reising Ethington P.C.

(57) ABSTRACT

A fiber placement head assembly for applying a plurality of composite tape segments on a mold that includes a fiber placement head configured to receive composite tape from a composite tape source and apply the composite tape to the mold. The assembly also includes one or more air-operating (Continued)

conveyors, coupled with the fiber placement head, each having an inlet that is configured to receive an end of composite tape from the composite tape source, an outlet configured to provide the end of composite tape to the fiber placement head, and one or more inline vacuum conveyors that are configured to receive compressed fluid from a source and direct the compressed fluid toward the outlet thereby transporting the end of the composite tape from the inlet to the outlet and into the fiber placement head.

14 Claims, 9 Drawing Sheets

US 11,135,787 B1

AUTOMATICALLY-THREADING FIBER PLACEMENT HEAD

TECHNICAL FIELD

The present application relates to fiber placement machines and, more particularly, to a fiber placement head that threads composite tape into the head from a spool.

BACKGROUND

Fiber placement machines are used to create composite workpieces. Composite tape or material, in the form of fibrous material impregnated with resin, is applied by the machines to a mold or mandrel at precise locations and lengths to collectively form a composite workpiece. The fiber placement machines move a fiber placement head over the mold to precisely apply composite tape in the ultimate shape of the composite workpiece. As the fiber placement head moves, it leaves a plurality of composite tape segments, also referred to as course, or tows, behind on the mold. As composite tape segments are applied to the mold, the length of the segment(s) is defined by a cutting action that separates the segments from a supply of composite tape on a spool. Some workpieces involve the application of differently sized composite tape that can be stored on or carried by other spools and/or fiber placement heads. When a different composite tape is needed, a robotic arm can release an existing fiber placement head threaded with one type or size of composite tape and select a new, different fiber placement head threaded with a different type or size of composite tape. Each fiber placement head can be pre-threaded with composite tape by a person, such as a machine operator, who manually threads an end of the composite tape from a spool to the fiber placement head. However, maintaining a plurality of fiber placement heads each with its own manually threaded composite tape can increase cost and complexity.

SUMMARY

In one implementation, fiber placement head assembly for applying a plurality of composite tape segments on a mold that includes a fiber placement head configured to receive composite tape from a composite tape source and apply the composite tape to the mold. The assembly also includes one or more air-operating conveyors, coupled with the fiber placement head, each having an inlet that is configured to receive an end of composite tape from the composite tape source, an outlet configured to provide the end of composite tape to the fiber placement head, and one or more inline vacuum conveyors that are configured to receive compressed fluid from a source and direct the compressed fluid toward the outlet thereby transporting the end of the composite tape from the inlet to the outlet and into the fiber placement head.

In another implementation, a fiber placement head assembly for applying a plurality of composite tape segments on a mold includes a fiber placement head that is configured to receive composite tape from a composite tape source and apply the composite tape to the mold; one or more air-operating conveyors, coupled with the fiber placement head, each having an inlet that is configure to receive an end of composite tape, an outlet configured to provide the end to the fiber placement head, and one or more inline vacuum conveyors that are configured to receive compressed fluid from a source and direct the compressed fluid toward the outlet thereby transporting the end of the composite tape from the inlet to the outlet and into the fiber placement head; and a plurality of composite tape sources each configured to releasably couple with the fiber placement head and including a pinch roller assembly that selectively supplies composite tape to the inlet of the air-operating conveyors.

In yet another implementation, a fiber placement head assembly for applying a plurality of composite tape segments on a mold includes a fiber placement head that is configured to receive composite tape from a composite tape source and apply the composite tape to the mold; a plurality of air-operating conveyors coupled with the fiber placement head, each having an inlet that is configured to receive an end of composite tape, an outlet configured to provide the end to the fiber placement head, and at least one inline vacuum conveyor that is configured to receive compressed fluid from a source and direct the compressed fluid toward the outlet thereby transporting the end of the composite tape from the inlet to the outlet and into the fiber placement head; a plurality of composite tape sources each configured to releasably couple with the fiber placement head and including: a spool storing composite tape, a pinch roller assembly that selectively supplies composite tape to the inlet of the air-operating conveyors, and at least one redirect roller contacting the composite tape between the source and the pinch roller assembly.

DETAILED DESCRIPTION

A fiber placement machine can use a robotic arm carrying a fiber placement head that releasably connects with a plurality of composite tape sources and automatically communicate the composite tape from a composite tape source to the fiber placement head. The fiber placement head can include tubing that receives compressed air from an air operating conveyor and extends from the composite tape source to the fiber placement head. The tubing can communicate composite tape from the source to the fiber placement head. After the fiber placement head attaches to the composite tape source, an end of the composite tape can be positioned at an inlet of the tubing. The air operating conveyor can feed compressed air or fluid into the tubing in one direction toward the fiber placement head thereby drawing the composite tape from the composite tape source at the inlet of the tubing and sending the composite tape end to an outlet of the tubing to a roller of the fiber placement head where the composite tape can be controlled by the head and applied to the mold during formation of the composite workpiece. Composite tape used to create composite workpieces is often comprised of fibrous material which has been impregnated with a resin that later provides strength to the composite workpiece after the resin is activated with heat. This is often referred to as "pre-preg" composite. One example of a composite material is carbon fiber.

Figure 1:
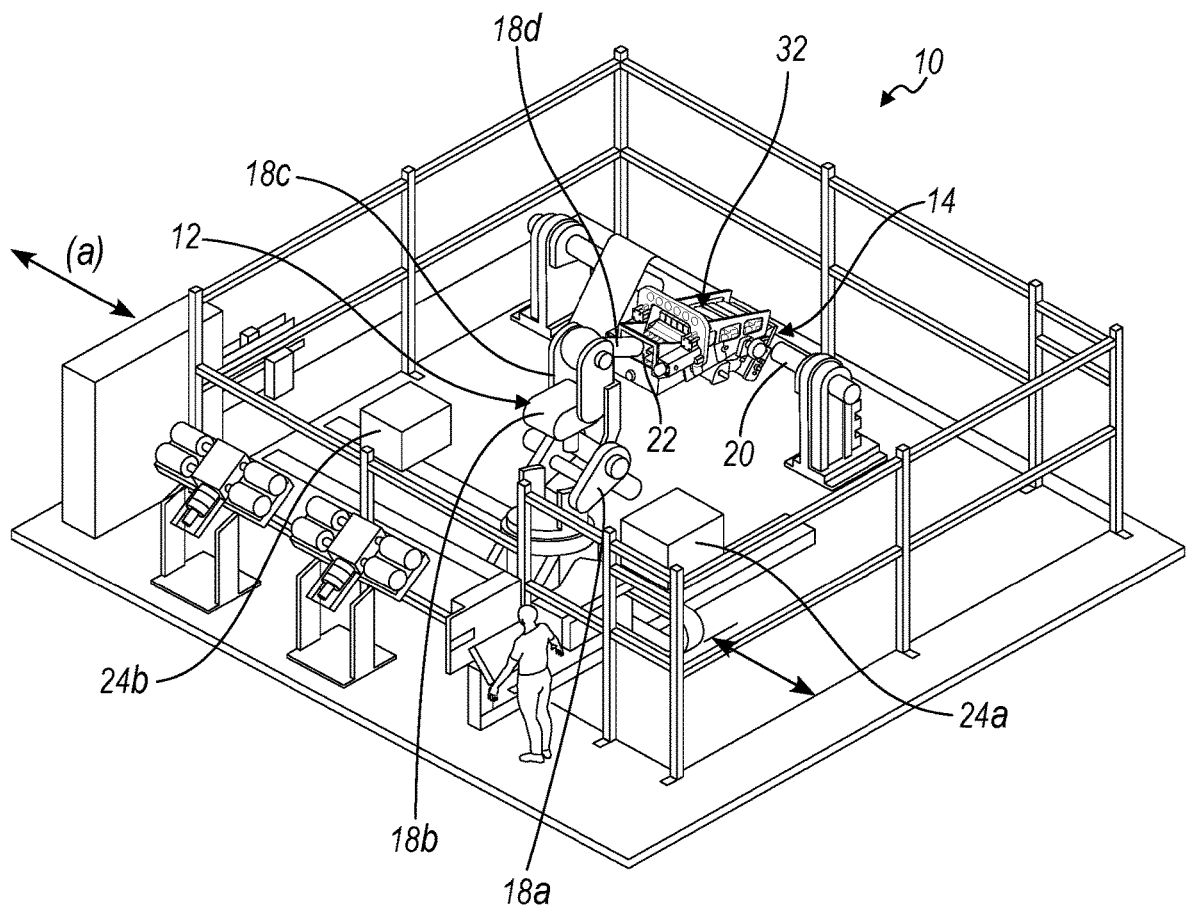
FIG. 1 is a perspective view depicting an implementation of a fiber placement machine.

An implementation of a fiber placement machine 10 is shown in FIG. 1. The fiber placement machine 10 includes a robotic arm 12 that is detachably coupled with a fiber placement head 14. The robotic arm can be supported by a base 16 upon which it moves linearly about an axis (x). A plurality of moveable segments 18, that can move by pivoting, rotating, or telescoping for example, may extend outwardly from the base 16. The robotic arm 12 can move relative to the base 16 about multiple axes. For example, a first segment 18a can rotatably couple to the base 16 at one end such that the robotic arm 12 can rotate about the base 16. A second segment 18b can pivotably couple with the first segment 18a and a third segment 18c can pivotably couple with the second segment. A fourth segment 18d can be coupled to the third segment 18c and telescopically move away from and toward the third segment. The segments 18 can be moved relative to each other using fluidic rams, electric motors, or some combination of these or other drive elements to move a distal end of the robotic 12 arm relative to a mold 20 or mandrel used to create a workpiece.

Figure 2:
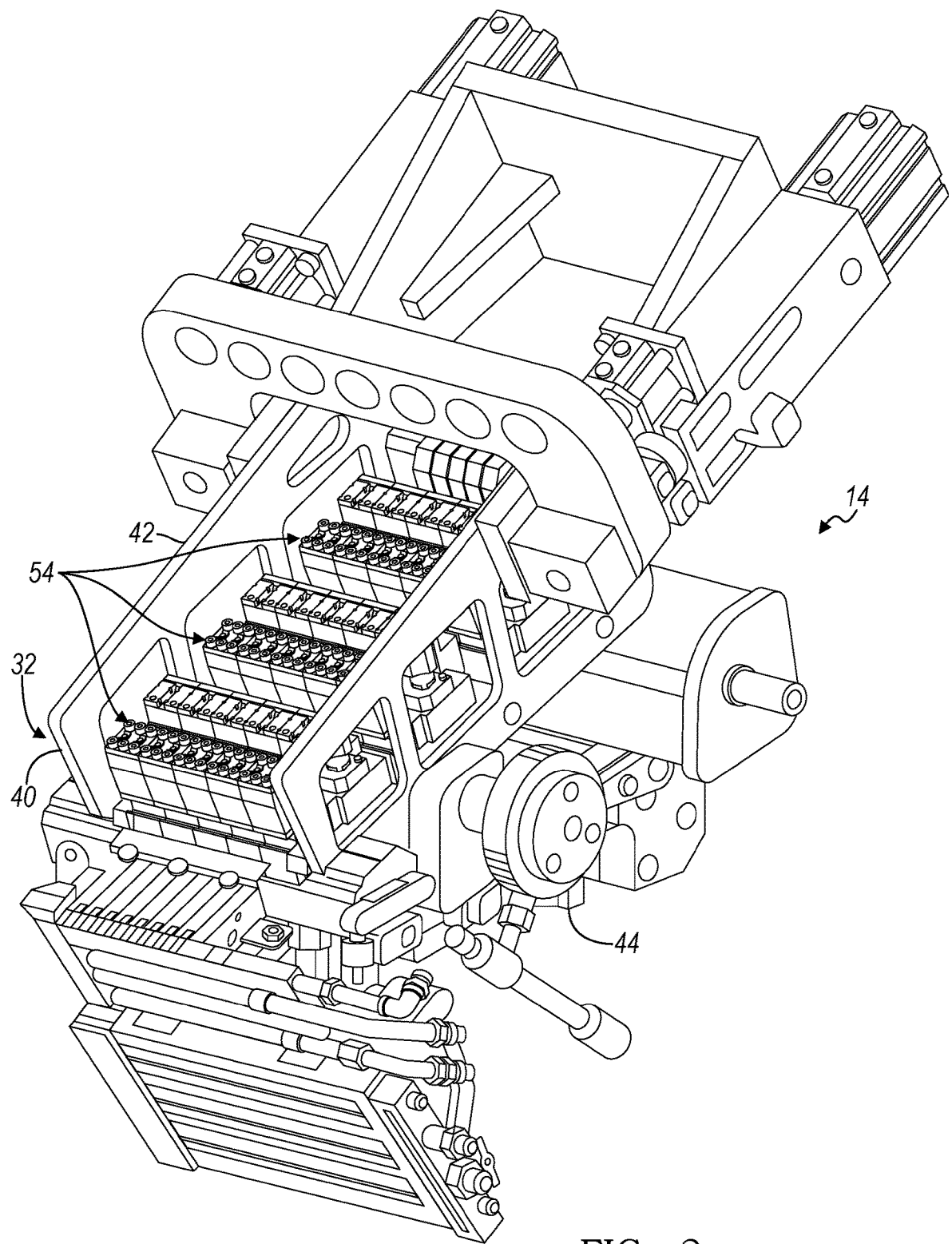
FIG. 2 is a perspective view depicting an implementation of a portion of a fiber placement head.

A plurality of composite tape sources 24 (sometimes referred to as creels) can be releasably coupled with the fiber placement head 14. In this embodiment, the robotic arm 12 can move along an axis (a) so that the fiber placement head 14 is proximate a first composite tape source 24a. The robotic arm 12 can couple with the first composite tape source 24a so that the source 24a moves with the arm 12 as the arm 12 moves along the axis(a). The first composite tape source 24a can supply one type or size of composite tape to the fiber placement head 14. The fiber placement head 14, shown in more detail in FIG. 2, can draw an end of the composite tape supplied by the first composite tape source 24a toward its compaction roller using an air-operated conveyor supplied by compressed fluid, such as compressed air, and carried by the head 14. The air-operated conveyor will be discussed below in more detail. The fiber placement head 14 receives the composite tape from the first composite tape source 24a until a different type of composite tape is desired. The robotic arm 12 can then move along the axis (a) to one end of its available range of travel along the axis (a), cut the composite tape, and detach from the first composite tape source 24a leaving the source 24a at the end of the axis (a). The robotic arm 12 can then move away from the first composite tape source 24a toward another end of the axis (a) where the arm 12 can couple with a second composite tape source 24b. The fiber placement head 14 can draw an end of the composite tape supplied by the second composite tape source 24b toward its compaction roller using an air-operated conveyor supplied by compressed air and carried by the head 14 as described above.

A microprocessor (not shown) in communication with a computer readable storage medium having executable instructions can control movement of the fluidic rams, electric motors, or other drive element thereby controlling the motion and position of the moveable segments 18 of the robotic arm 12. The microprocessor can also control the supply of compressed fluid to the air-operated conveyor as well as roller assemblies. The microprocessor can be any type of device capable of processing electronic instructions including microcontrollers, host processors, controllers, and application specific integrated circuits (ASICs). It can be a dedicated processor used only to carry out control of the robotic arm 12 or can be shared with other machine functions. The microprocessor executes various types of digitally-stored instructions, such as software or firmware programs stored in memory. Communications between the mechanism that moves the robotic arm, such as the fluidic rams or electric motors, and the microprocessor can be carried out over a communications bus. The robotic arm 12 can move the fiber placement head 14 along three axes to position the head 14 for service or to apply composite tape to the mold 20. While this is one implementation of a robotic arm 12 that can be used with a fiber placement head, other implementation of robotic arms or mechanical devices that apply composite tape can be used as well.

The end of the robotic arm 12 distal to the base 16 can include a chuck 22 that releasably engages the fiber placement head 14. The chuck 22 and a portion of the fiber placement head 14 can have corresponding features such that the chuck 22 can releasably grab the fiber placement head 14. In one implementation, the fiber placement head 14 includes a cylindrical shank extending orthogonal to a surface of the head 14. The robotic arm 12 can position the chuck 22 so that it engages the shank and the fiber placement head 14 is resiliently coupled to the arm 12.

Figure 3:
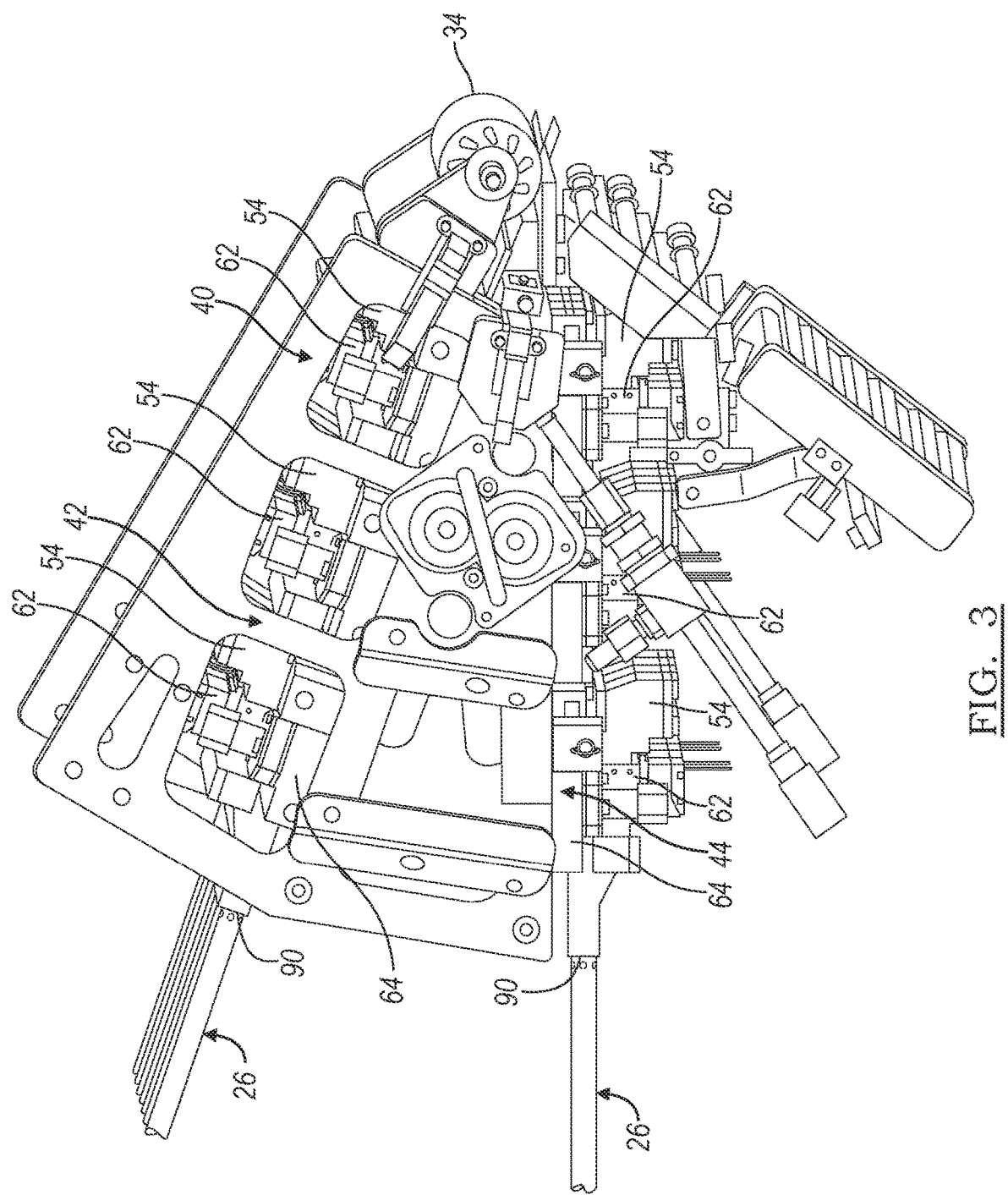
FIG. 3 is another perspective view depicting an implementation of a portion of a fiber placement head.
Figure 4:
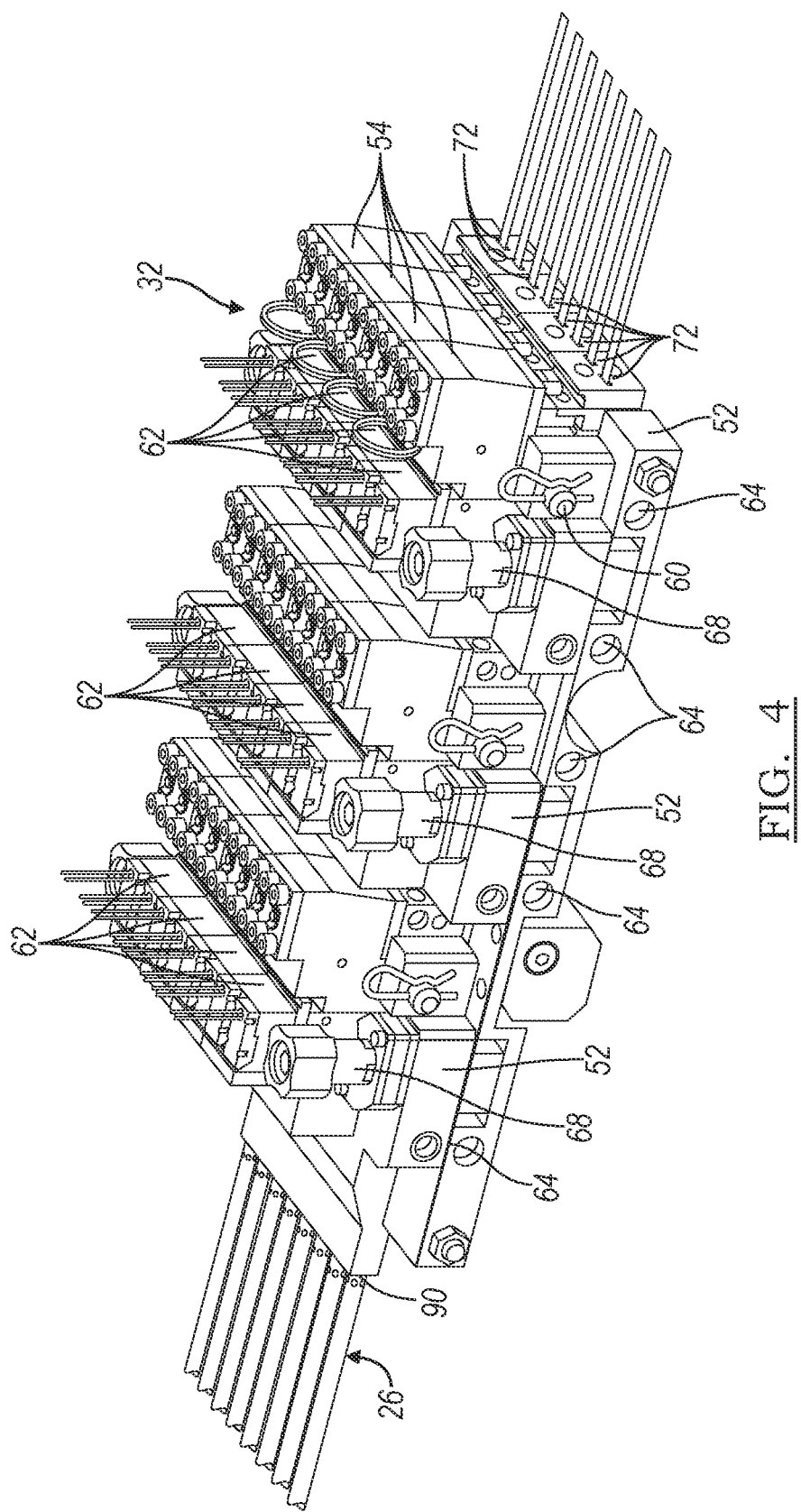
FIG. 4 is another perspective view depicting an implementation of a portion of a fiber placement head.

As shown in FIGS. 3-4, the fiber placement head 14 can include an air-operating conveyor 26 and a cut, clamp, restart (CCR) assembly 32 (shown in more detail in FIG. 4). The CCR assembly 32 can include a compaction roller 34 (or alternatively a compaction slide) that receives the composite tape from the composite tape sources 24 via the air-operating conveyor(s) 26 and apply it to the mold 20 to create a composite part. The composite tape can be supplied by the composite tape sources 24 and travel into the compaction roller 34 for ultimate application to the mold 20. In the present embodiment, the air-operating conveyor 26 is depicted supplying composite tape to one lane of the fiber placement head 14. However, it should be appreciated that additional air-operating conveyors 26 can be included with the fiber placement machine 10 to supply additional composite tape to separate lanes or individual fiber pathways of the fiber placement head 14 as is shown in FIG. 4.

The fiber placement head 14 can include a CCR frame 40 for supporting the components of the fiber placement head 14, the CCR assembly 32, and the compaction roller 34 that ultimately presses the course of composite tapes onto the mold 20. Before arriving at the compaction roller 34, a portion of the composite tapes can pass through an upper feed portion 42 and another portion of the composite tapes can pass through a lower feed portion 44. The upper feed portion 42 can process even numbered composite tape and the lower feed portion 44 can process odd numbered composite tape that meet at the compaction roller 34. For instance, for a fiber placement head 14 having eight fiber pathways or lanes, the upper feed portion 42 can process composite tape identified by numbers 2, 4, 6, and 8 while the lower feed portion 44 can process composite tape identified by numbers 1, 3, 5, and 7. The upper feed portion 42 and the lower feed portion 44 can be separated by an angle ($\alpha$). A plurality of lane assemblies 54 can be included with the upper feed portion 42 and the lower feed portion 44. Each of the upper feed portion 42 and the lower feed portion 44 can include a manifold 64 for receiving a plurality of mounting bases 52 that can releasably receive a plurality of the lane assemblies 54. The mounting base 52 can include valve attachments 68 that locate the base 52 relative to the manifold 64 and releasably couple a plurality of lane assemblies 54 relative to the fiber placement head 14. The valve attachments 68, such as a ball lock that locates the fluid passageways 66 from the mounting base 52 to the manifold 64, and helps form a fluid-tight seal with the base 52.

Electromechanical valves 62 abut the lane assemblies 54 and can be coupled to the mounting base 52. Each lane assembly 54 can abut an electromagnetic valve 62 such that the valve 62 selectively supplies compressed air to the assembly 54 for actuation. The mounting base 52 can couple with the manifold 64 and fluid passageways communicate compressed air from a source (not shown) to the electromechanical valves 62 ultimately arriving at the lane assemblies 54 coupled to the base 52. Compressed air can be selectively supplied to a lane assembly 54 by the electromagnetic valve 62 thereby communicating the air from the manifold 64. In one implementation, the electromagnetic valve 62 includes a solenoid receiving a voltage that is controlled by a switch the microprocessor opens and closes to control actuation of the lane assembly 54. An air-operating conveyor 26 with a plurality of tube can be coupled to the manifold 64 such that the outlet or output 90 of the tubes are connected in a fluid-tight manner to the manifold 64. The tubes of the air-operating conveyor 26 can communicate fiber tows to the CCR assembly 32 without manual operator assistance. In some implementations, a plurality of vent holes 102 can be formed adjacent the manifold 64 at the outlet 90 of the tubes. These vent holes 102 can facilitate the flow of compressed air through the tubes and assist the movement of fiber tows through the tubes.

Figure 5:
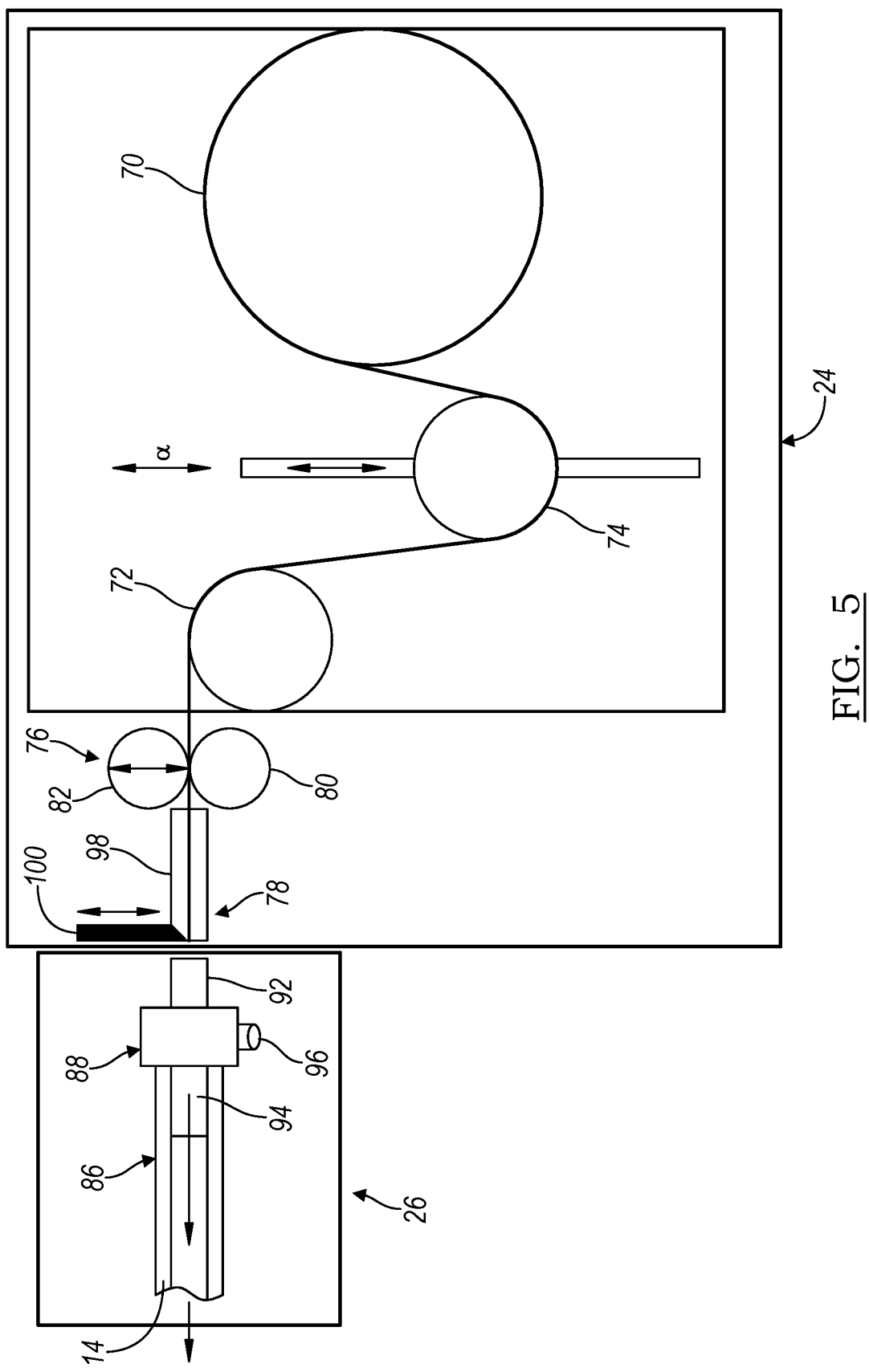
FIG. 5 is a cross-sectional view depicting an implementation of a composite tape source and an air-operating conveyor.
Figure 6:
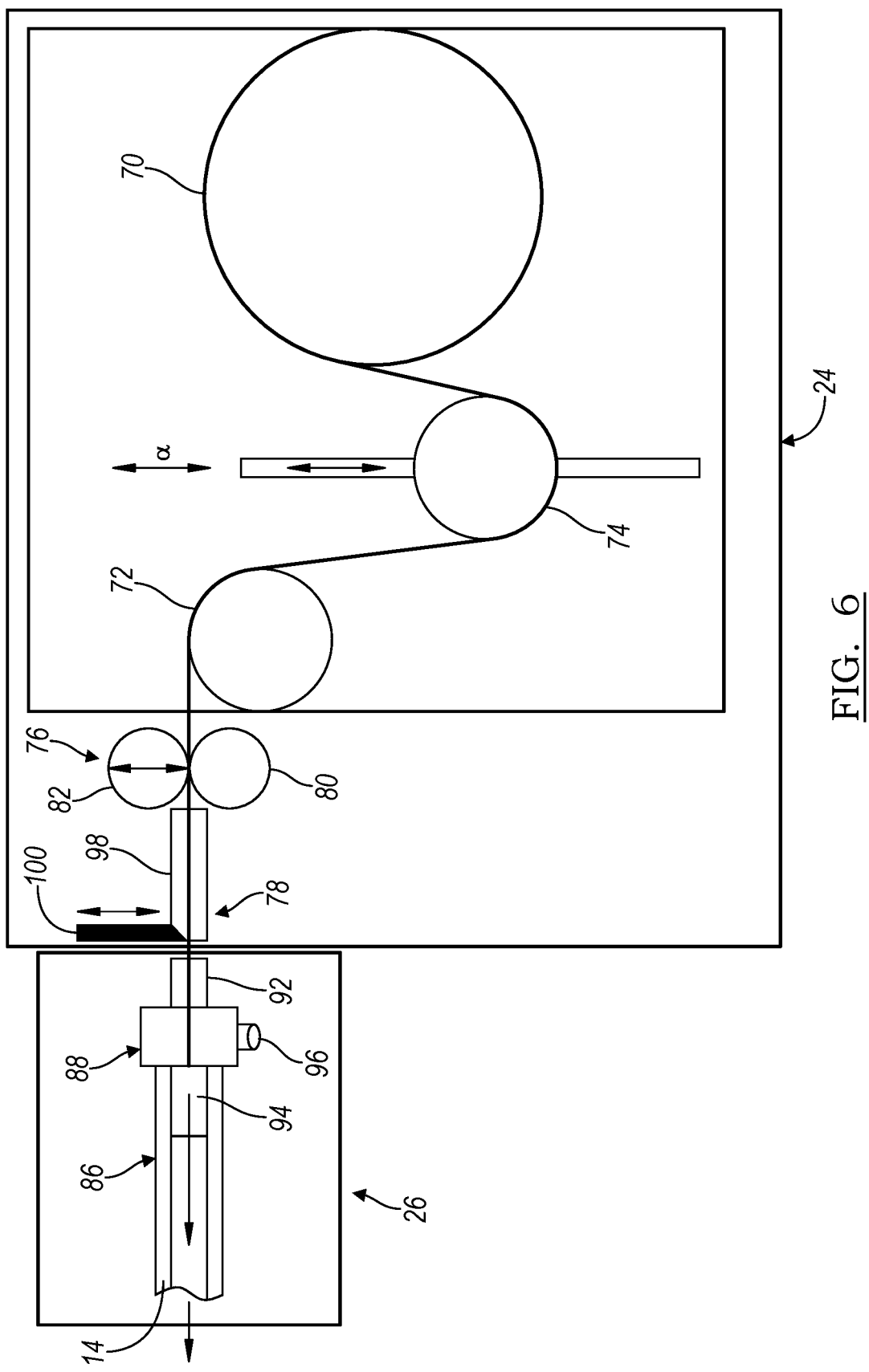
FIG. 6 is another cross-sectional view depicting an implementation of a composite tape source to an air-operating conveyor.

Turning to FIGS. 5-6, an implementation of a composite tape source 24 and an air-operating conveyor 26 is shown. The composite tape source 24 includes a supply spool 70 carrying composite tape, a fixed redirect roller 72, a dancer-mounted redirect roller 74, a pinch roller assembly 76, and a cutting assembly 78. Composite tape can be wound around the supply spool 70 that is mounted on a spindle (not shown) carried by the composite tape source 24. The spindle can be fixed in location to the composite tape source 24. A clutch can be coupled with the spindle to selectively permit the rotation of the spindle and also maintain a desired amount of tension on composite tape leaving the supply spool 70. The pinch roller assembly 76 include a braked roller 78 and a powered roller 80 at least one of which can have a movable axis of rotation so that a radial outer surface of the braked roller 80 is brought closer to the radial outer surface of the powered roller 82 so as to engage opposite sides of a composite tape strand. That is, the axis of rotation can slide along a linear pathway. The braked roller 80 can be permitted to rotate or can be held immobile without rotation depending on whether composite tape is being provided to the air-operating conveyor 26. A clutch can be included with the braked roller 80 and selectively activated to either permit the braked roller 80 to rotate or to hold the braked roller 80 immobile. The powered roller 82 can be coupled with an electric motor that selectively rotates the powered roller 82 to move the composite tape toward the air-operating conveyor 26. The dancer-mounted redirect roller 74 can be mounted on a spindle (not shown) that is movable along an axis (d) and biased in one direction to maintain a determined amount of tension on the composite tape between the pinch roller assembly 76 and the composite tape source 24. The bias can be passively created, such as by a spring, or actively created by any one of a variety of mechanisms, such as a fluidic ram or a solenoid. The dancer-mounted redirect roller 74 can maintain a desired amount of tension on the composite tape removed from the supply spool 70.

The composite tape source 24 can be threaded with an end of the composite tape carried by the supply spool 70 passing around the dancer-mounted redirect roller 74, the fixed redirect roller 72, and into engagement with both the braked roller 80 and the powered roller 82. After the robotic arm 12 moves the fiber placement head 14 such that the composite tape source 24 is coupled with the head 14, the pinch roller assembly 78 can move an end of the composite tape to an inlet 82 at an end of the air-operating conveyor 26 nearest the source 24. The air-operating conveyor 26 can include at least one segment of tubing 86 extending from the composite tape source 24 to the fiber placement head 14. The tubing can be implemented as any one of a variety of materials, such as plastic; an example includes PTFE. The conveyor 26 includes one or more in-line vacuum conveyors 88 somewhere along the segment of tubing 86 that receive compressed fluid from a source (not shown) and direct that compressed fluid toward the fiber placement head 14. The air-operating conveyor 26 includes an outlet 90 near the fiber placement head 14 (shown in FIG. 3) where the composite tape can be delivered. In one embodiment, the outlet 90 is positioned adjacent the upper feed roller 46 or the lower feed roller 48.

Figure 7:
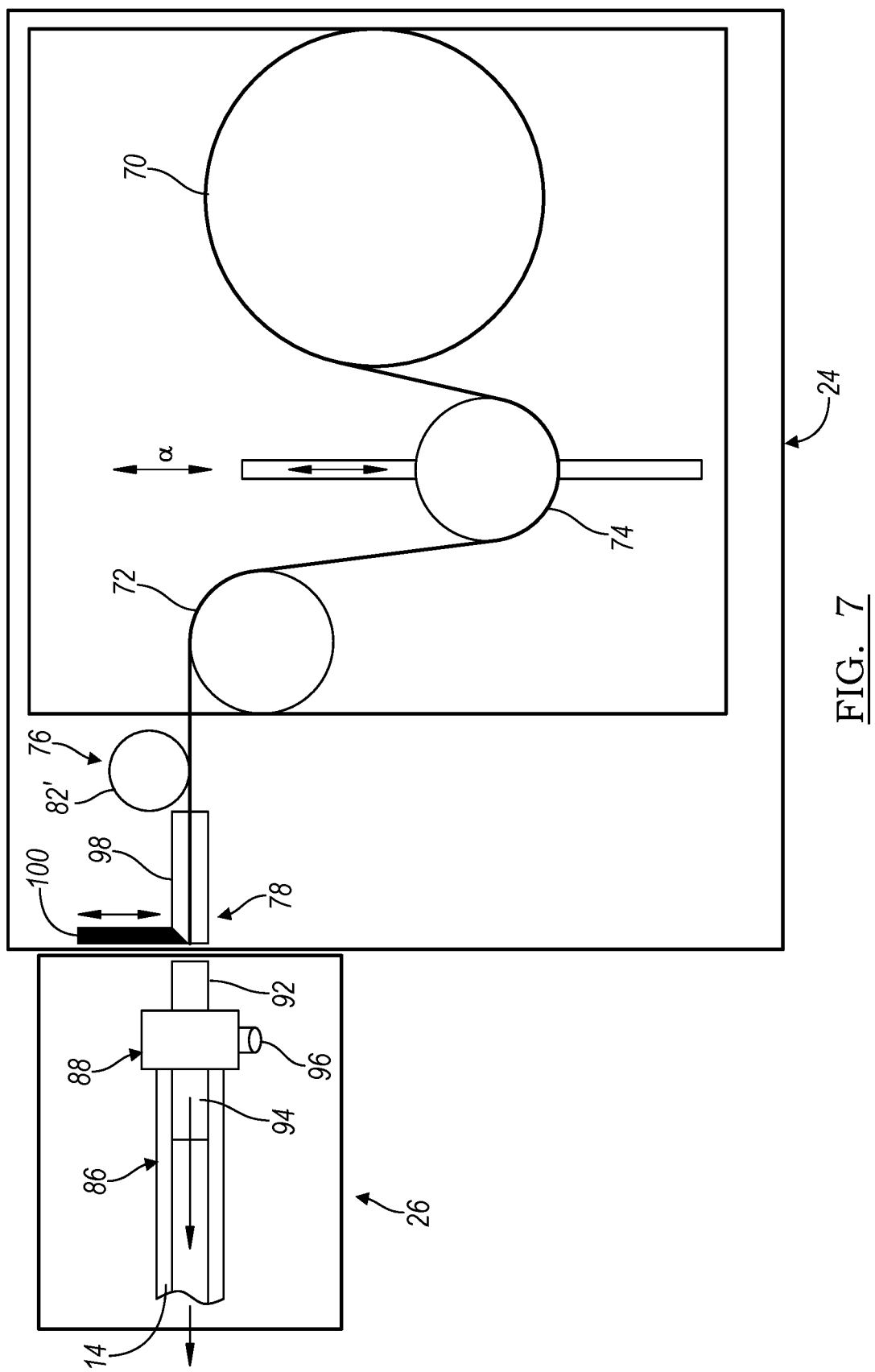
FIG. 7 is a cross-sectional view depicting another implementation of a composite tape source and an air-operating conveyor.
Figure 8:
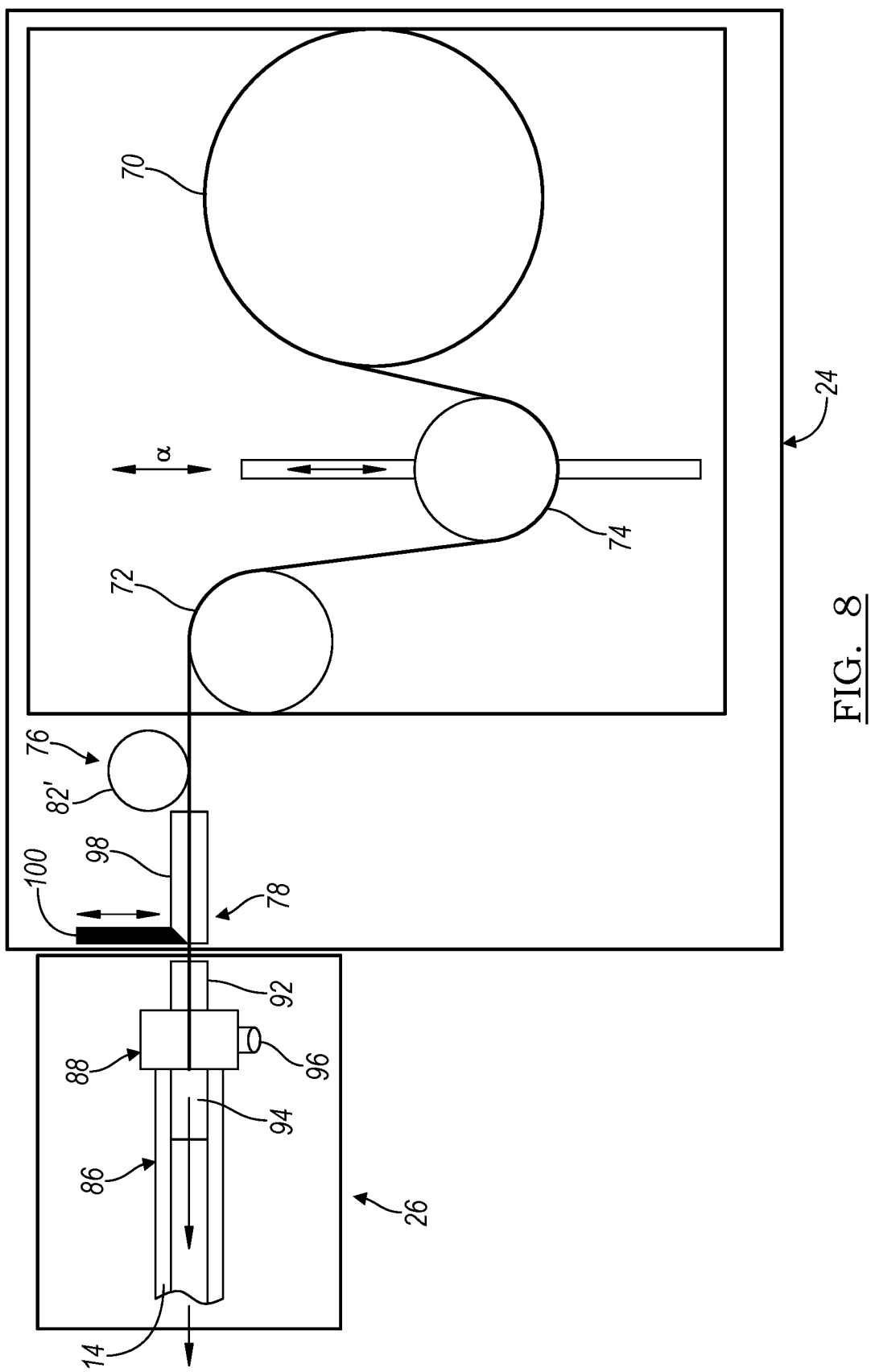
FIG. 8 is another cross-sectional view depicting another implementation of a composite tape source to an air-operating conveyor.

In FIGS. 7-8, another implementation of a composite tape source 24 and air-operating conveyor 26 is shown. The implementation shown in FIGS. 7-8 is similar to what is shown in FIGS. 5-6 but lacks the pinch roller assembly 76. Instead, the pinch roller assembly can be replaced with a passive redirect roller 82'.

Figure 9:
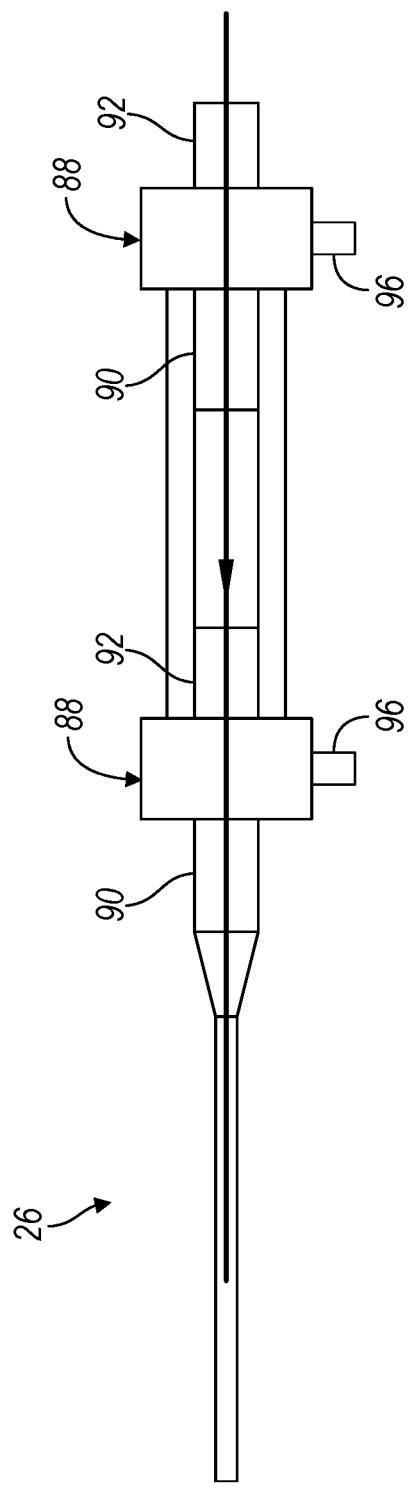
FIG. 9 is a cross-sectional view depicting an implementation of an air-operating conveyor.

Turning to FIG. 9, an implementation of the in-line vacuum conveyor(s) 88 can include an inlet 92, an outlet 94, a fluid supply orfice 96, and a plurality of fluid jets (not shown) that receive compressed fluid at the fluid supply orfice 96 and direct the compressed fluid toward the fiber placement head 14 and the outlet 90 of the conveyor 26. The outlet 90 and/or the inlet 92 can fit inside the inner diameter of the tubing 86 and coupled with hose clamps. Or in other implementations, the outlet 90 and/or inlet 92 can be threaded with corresponding threads on the tubing 86. The flow of compressed fluid created by the in-line vacuum conveyors 88 toward the fiber placement head 14 can create a vacuum at the inlet of the air-operating conveyor 26 adjacent the composite tape source 24 that can carry the end of the composite tape to the fiber placement head 14 and out the outlet without human assistance. One implementation of the inline vacuum conveyor 88 is described using the name "Line Vac™" and sold commercially by the Exair Corporation. While the embodiment described above depicts one air-operating conveyor and one source, it should be appreciated that different implementations can use a plurality of air-operating conveyors, such as one for each of a plurality of composite tapes that are simultaneously applied to the mold by the fiber placement head. Or in some implementations one segment of tubing 86 can include more than one in-line vacuum conveyor 88.

The cutting assembly 78 including an anvil 98 and a reciprocating cutting blade 100 can be positioned in between the pinch roller assembly 76 and the air-operating conveyor 26. When the cutting blade 100 is separated from the anvil 98, the composite tape can pass between then on the way to the air-operating conveyor 26. The pinch roller assembly 76 can move the composite tape 26 in between the cutting blade 100 and the anvil 98; the cutting blade 100 can be moved through the tape against the anvil 98 to cut the composite tape. The composite tape can be cut when the robotic arm 12 detaches from the composite tape source 24 and moves it into a storage position.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A fiber placement head assembly for applying a plurality of composite tape segments on a mold, comprising:
    a fiber placement head that is configured to receive composite tape and apply the composite tape to the mold; and
    one or more air-operating conveyors, coupled with the fiber placement head, each having an inlet that is configured to receive an end of composite tape, an outlet configured to provide the end of composite tape to the fiber placement head, and one or more inline vacuum conveyors that are configured to receive compressed fluid from a source and direct the compressed fluid toward the outlet thereby transporting the end of the composite tape from the inlet to the outlet and into the fiber placement head.

2. The fiber placement head recited in claim 1, wherein the fiber placement head comprises a plurality of fiber pathways coupled with a plurality of air-operating conveyors.

3. The fiber placement head recited in claim 1, wherein the air-operating conveyor includes a segment of tubing having the inlet and the outlet with the inline vacuum conveyor at the inlet, at the outlet, or in between the inlet and the outlet.

4. The fiber placement head recited in claim 1, wherein the composite tape source is configured to be releasably coupled to the fiber placement head.

5. The fiber placement head recited in claim 1, wherein the composite tape source comprises a pinch roller assembly and a cutting assembly.

6. The fiber placement head recited in claim 5, wherein the composite tape source comprises a redirect roller contacting composite tape in between the pinch roller assembly and the cutting assembly.

7. A fiber placement head assembly for applying a plurality of composite tape segments on a mold, comprising:
    a fiber placement head that is configured to receive composite tape from a composite tape source and apply the composite tape to the mold;
    one or more air-operating conveyors, coupled with the fiber placement head, each having an inlet that is configure to receive an end of composite tape, an outlet configured to provide the end to the fiber placement head, and one or more inline vacuum conveyors that are configured to receive compressed fluid from a source and direct the compressed fluid toward the outlet thereby transporting the end of the composite tape from the inlet to the outlet and into the fiber placement head; and
    a plurality of composite tape sources each configured to releasably couple with the fiber placement head and including a pinch roller assembly that selectively supplies composite tape to the inlet of the air-operating conveyors.

8. The fiber placement head recited in claim 7, wherein the fiber placement head comprises a plurality of fiber pathways coupled with a plurality of air-operating conveyors.

9. The fiber placement head recited in claim 7, wherein the air-operating conveyor includes a segment of tubing having the inlet and the outlet with the inline vacuum conveyor positioned at the inlet, at the outlet, or in between the inlet and the outlet.

10. The fiber placement head recited in claim 7, wherein the composite tape source comprises a pinch roller assembly and a cutting assembly.

11. The fiber placement head recited in claim 10, wherein the composite tape source comprises a redirect roller contacting composite tape in between the pinch roller assembly and the cutting assembly.

12. A fiber placement head assembly for applying a plurality of composite tape segments on a mold, comprising:
    a fiber placement head that is configured to receive composite tape from a composite tape source and apply the composite tape to the mold;
    a plurality of air-operating conveyors coupled with the fiber placement head, each having an inlet that is configured to receive an end of composite tape, an outlet configured to provide the end to the fiber placement head, and at least one inline vacuum conveyor that is configured to receive compressed fluid from a source and direct the compressed fluid toward the outlet thereby transporting the end of the composite tape from the inlet to the outlet and into the fiber placement head;
    a plurality of composite tape sources each configured to releasably couple with the fiber placement head and including: a spool storing composite tape, a pinch roller assembly that selectively supplies composite tape to the inlet of the air-operating conveyors, and at least one redirect roller contacting the composite tape between the source and the pinch roller assembly.

13. The fiber placement head recited in claim 12, wherein the fiber placement head comprises a plurality of fiber pathways.

14. The fiber placement head recited in claim 12, wherein the air-operating conveyor(s) include(s) a segment of tubing having the inlet and the outlet with the inline vacuum conveyor positioned at the inlet, at the outlet, or in between the inlet and the outlet.

* * * * *